US012569790B2

(12) United States Patent (10) Patent No.: US 12,569,790 B2
Imoto (45) Date of Patent: Mar. 10, 2026

(54) ELEMENT OF, CARTRIDGE AND CONTAINER WITH, FILTER FOR SLURRY

(71) Applicant: ROKI TECHNO CO., LTD., Tokyo (JP)

(72) Inventor: Kyosuke Imoto, Tokyo (JP)

(73) Assignee: ROKI TECHNO CO., LTD., Tokyo (JP)

( * ) Notice: Subject to any disclaimer, the term of this patent is extended or adjusted under 35 U.S.C. 154(b) by 518 days.

(21) Appl. No.: 17/921,797

(22) PCT Filed: Apr. 26, 2021

(86) PCT No.: PCT/JP2021/016688
§ 371 (c)(1),
(2) Date: Oct. 27, 2022

(87) PCT Pub. No.: WO2021/221027
PCT Pub. Date: Nov. 4, 2021

(65) Prior Publication Data
US 2023/0166204 A1 Jun. 1, 2023

(30) Foreign Application Priority Data
Apr. 30, 2020 (JP) ................................ 2020-080190

(51) Int. Cl.
*B01D 39/14* (2006.01)
*B01D 29/21* (2006.01)
(Continued)

(52) U.S. Cl.
CPC ........... *B01D 39/14* (2013.01); *B01D 29/216* (2013.01); *B32B 3/30* (2013.01); *B32B 5/022* (2013.01);
(Continued)

(58) Field of Classification Search
CPC ......... B01D 2101/00; B01D 2101/005; B01D 39/00; B01D 39/08; B01D 39/083;
(Continued)

(56) References Cited

U.S. PATENT DOCUMENTS

2013/0334128 A1* 12/2013 Takagi ................. B01D 65/003
                                                          210/321.83
2015/0298068 A1 10/2015 Park et al.
(Continued)

FOREIGN PATENT DOCUMENTS

JP        2012136792 A        7/2012
JP        2014102967 A        6/2014
(Continued)

*Primary Examiner* — Allison G Fitzsimmons
(74) *Attorney, Agent, or Firm* — BakerHostetler

(57) ABSTRACT

A long-life in filters is required as filter members for slurry liquid having high-viscosity and high-solid-content ratio. It is provided to solve the problem, the filter element for filtering slurry liquid, wherein nets and non-woven fabrics are alternately layered, wherein each of the nets has first fibers parallelly extending in one direction and second fibers parallelly extending in a direction angled to the one direction and contacting sides of the first fibers, wherein the first and second fibers forms mesh-pores at portions surrounded by the first and second fibers, wherein each of the non-woven fabrics has protrusions on surfaces of the each of the non-woven fabrics in a thickness-direction, the protrusions formed to repeatedly come out on the surfaces of the each of the non-woven fabrics in a surface-direction of the each of the non-woven fabrics.

16 Claims, 6 Drawing Sheets

(51) Int. Cl.
    *B32B 3/30*       (2006.01)
    *B32B 5/02*       (2006.01)
    *B32B 5/26*       (2006.01)

(52) U.S. Cl.
    CPC .............. *B32B 5/028* (2013.01); *B32B 5/273*
    (2021.05); *B01D 2201/29* (2013.01); *B01D*
    *2239/0618* (2013.01); *B01D 2239/0636*
    (2013.01); *B01D 2239/064* (2013.01); *B01D*
    *2239/065* (2013.01); *B01D 2239/0695*
    (2013.01); *B01D 2239/1233* (2013.01); *B32B*
    *2250/02* (2013.01); *B32B 2250/20* (2013.01);
    *B32B 2262/16* (2021.05); *B32B 2307/726*
    (2013.01)

(58) Field of Classification Search
    CPC .... B01D 39/14; B01D 39/16; B01D 39/1607;
    B01D 39/1623; B01D 38/20; B01D
    69/12; B01D 69/1216; B01D 69/1071;
    B01D 2239/06; B01D 2239/065; B01D
    2239/0695; B01D 63/081; B01D
    2313/146; B01D 63/00; B01D 69/02;
    B01D 65/08; B01D 2321/2016; B01D
    2323/06; B01D 2325/022; B01D 63/082;
    B01D 63/14; B01D 65/003; B01D 65/02;
    B01D 67/00135; B01D 69/061; B01D
    69/106; B01D 2325/06; B01D 63/084;
    B01D 69/06; B01D 2239/10; B01D
    2255/1023; B01D 2256/16; B01D
    2257/102; B01D 2257/50; B01D 2257/80;
    B01D 2313/08; B01D 2313/14; B01D
    2319/02; B01D 2321/185; B01D
    2321/2058; B01D 2325/20; B01D 25/26;
    B01D 39/2017; B01D 53/22; B01D
    61/28; B01D 63/08; B01D 63/0821;
    B01D 63/0822; B01D 63/10; B01D
    63/16; B01D 65/00; B01D 67/0002;
    B01D 67/00933; B01D 69/10; B01D
    69/107; B01D 69/1213; B01D 69/125;
    B01D 71/56; B01D 2201/0407; B01D
    2201/188; B01D 2239/04; B01D
    2239/0428; B01D 2239/0464; B01D
    2239/0609; B01D 2239/0618; B01D
    2239/0654; B01D 2239/0668; B01D
    2239/0672; B01D 2239/0677; B01D
    2239/086; B01D 2239/1233; B01D
    2271/027; B01D 2275/00; B01D 2275/10;
    B01D 2275/206; B01D 2313/04; B01D
    2313/143; B01D 2321/04; B01D 2321/00;
    B01D 2321/2025; B01D 2323/12; B01D
    2323/38; B01D 2323/42; B01D 2323/46;
    B01D 2325/04; B01D 2325/28; B01D
    25/001; B01D 25/24; B01D 29/111;
    B01D 29/15; B01D 29/17; B01D 29/216;
    B01D 29/62; B01D 29/66; B01D
    35/0273; B01D 35/153; B01D 37/02;
    B01D 39/18; B01D 46/0032; B01D
    46/10; B01D 46/2411; B01D 46/4281;
    B01D 46/521; B01D 46/522; B01D
    46/525; B01D 46/546; B01D 46/71;
    B01D 61/00; B01D 61/025; B01D
    61/027; B01D 61/14; B01D 67/0013;
    B01D 67/00165; B01D 69/00; B01D
    69/108; B01D 69/1214; B01D 71/261;
    B01D 71/262; B01D 71/68; C02F 1/44;
    C02F 3/1273; C02F 2303/04; C02F
    1/003; C02F 1/441; C02F 1/4606; C02F
    1/4672; C02F 1/505; C02F 11/004; C02F
    2103/08; C02F 2307/06; C02F 1/442;
    C02F 1/444; C02F 2209/44; C02F
    2209/445; B32B 5/022; B32B 5/26; B32B
    2262/02; B32B 2262/0253; B32B
    2262/0261; B32B 2262/0276; B32B
    2307/50; B32B 2307/728; B32B 2307/73;
    B32B 2307/734; B32B 2605/00; B32B
    3/26; B32B 3/30; B32B 5/024; B32B
    5/028; B32B 5/22; B32B 7/03; B32B
    7/12
    See application file for complete search history.

(56)         References Cited

U.S. PATENT DOCUMENTS

| | | | |
|---|---|---|---|
| 2022/0096976 A1 | 3/2022 | Mineo et al. | |
| 2022/0193586 A1 | 6/2022 | Mineo et al. | |

FOREIGN PATENT DOCUMENTS

| | | | |
|---|---|---|---|
| JP | 2015097979 A | 5/2015 | |
| JP | 2016101552 A | 6/2016 | |
| JP | 2018-126721 A | 8/2018 | |
| JP | 2020049413 A | 4/2020 | |
| JP | 2020056119 A | 4/2020 | |
| WO | 2018/037436 A1 | 3/2018 | |
| WO | 2020/066767 A1 | 4/2020 | |
| WO | 2020/196515 A1 | 10/2020 | |

* cited by examiner

FIG. 3C

ELEMENT OF, CARTRIDGE AND CONTAINER WITH, FILTER FOR SLURRY

CROSS-REFERENCE TO RELATED APPLICATIONS

This application is a National Stage of International Patent App No. PCT/JP2021/016688, filed Apr. 26, 2021, which claims the benefit of Japanese Patent Application No. JP 2020-080190, filed Apr. 30, 2020, the entire disclosures of both of which are hereby incorporated by reference as if set forth in their entirety herein.

TECHNICAL FIELD

The invention of the present application relates to a filter element for slurry through what slurry liquid with high-viscosity and high-solid-content ratio is flowed, for filtering large particles and aggregation substances included in the slurry liquid.

BACKGROUND ART

For example, slurry liquid in which active substances for electrodes and high-density carbon particles are dispersed and included, the slurry liquid having a high-viscosity of 500 centipoise or more and a high-solid-content ratio of 10 weight percentage or more, is used for a positive electrode in a secondary cell like a lithium-ion battery, as paste for electrodes.

Not only for filtrations of these kind of slurry liquid having high-viscosity and high-solid-content ratio, generally, in filtrations of liquid including particles, collection of the particles as the function for the purpose of the filter causes clogging of the filter and the degradation of the flowability of the liquid, so that the life of the filter is easily reduced consequently. Especially, because slurry liquid having high-viscosity and high-solid-content ratio tends to have high flow-resistance, the decrease of the flowability of the liquid caused by the clogging of the filter by the collection of the particles remarkably comes out and tends to lead to the short life of the filter.

CITATION LIST

Patent Literature

PTL 1: Japanese Patent Application Laid-open No. 2016-101552
PTL 2: Japanese Patent Application Laid-open No. 2014-102967

SUMMARY OF INVENTION

Technical Problem

For example, PTL 1 and PTL 2 disclose a filter device for filtering slurry liquid used for electrode paste of the secondary battery. PTL 1 discloses a filter having a rectifier at the position of the filter on the upstream side of the fluid flow to collect the solid-content in slurry and prevent initial clogging. PTL 2 discloses a filter made of a material whose intermolecular force with regard to carbon particles is low, to prevent filter clogging by collecting solid-content in slurry at the upstream side of the filter.

However, although PTL 1 and PTL 2 focus on mesh structures and materials of filters to prevent the filters through which liquid passes from causing clogging, there is limitation to elongate a filter life by prevention of filter-mesh-clogging in each of layers of a filter. It is important to maintain flow paths of liquid in a filter besides the prevention of filter-mesh-clogging on the achievement of the long-life of filters. Especially, A long-life in filters is required as filter members for slurry liquid having high-viscosity and high-solid-content ratio.

Solution to Problem

It is provided to solve the above problem, in filter members made of nets and filter elements, structurally, filter members that maintain flow passes of liquid in a filter.

It is provided to solve the above problem, a filter element for filtering slurry liquid, the filter element including a layered member of nets and non-woven fabrics in which each of the nets and the non-woven fabrics are alternately layered, wherein each of the nets has first fibers parallelly extending in one direction and second fibers parallelly extending in a direction angled to the one direction and contacting sides of the first fibers, wherein the first fibers and the second fibers forms mesh-pores at portions surrounded by the first fibers and the second fibers, wherein each of the non-woven fabrics has protrusions on surfaces of the each of the non-woven fabrics in a thickness-direction of the each of the non-woven fabrics, the protrusions formed to repeatedly come out on the surfaces of the each of the non-woven fabrics in a surface-direction of the each of the non-woven fabrics, and wherein in the protrusions in the thickness-direction, a height of anyone of the protrusions and the mesh-pores of the each of the nets are formed such that from one of the surfaces of a net among the nets next to anyone of the non-woven fabrics, through anyone of the mesh-pores corresponding to the anyone of the protrusions among the protrusions, the anyone of the protrusions among the protrusions of the non-woven fabrics does not reach an opposite side to the one of the surfaces of the net next to anyone of the non-woven fabrics.

It is provided to solve the above problem, a filter cartridge having a filter element for filtering slurry liquid, the filter element including a layered member of nets and non-woven fabrics in which each of the nets and the non-woven fabrics are alternately layered, wherein each of the nets has first fibers parallelly extending in one direction and second fibers parallelly extending in a direction angled to the one direction and contacting sides of the first fibers, wherein the first fibers and the second fibers forms mesh-pores at portions surrounded by the first fibers and the second fibers, wherein each of the non-woven fabrics has protrusions on surfaces of the each of the non-woven fabrics in a thickness-direction of the each of the non-woven fabrics, the protrusions formed to repeatedly come out on the surfaces of the each of the non-woven fabrics in a surface-direction of the each of the non-woven fabrics, and wherein in the protrusions in the thickness-direction, a height of anyone of the protrusions and the mesh-pores of the each of the nets are formed such that from one of the surfaces of a net among the nets next to anyone of the non-woven fabrics, through anyone of the mesh-pores corresponding to the anyone of the protrusions among the protrusions, the anyone of the protrusions among the protrusions of the non-woven fabrics does not reach an opposite side to the one of the surfaces of the net next to anyone of the non-woven fabrics, and a mesh-type cover including cylindrical shape in which the filer element is contained on an outside of the filter element.

It is provided to solve the above problem, a filter container in which a filter element for filtering slurry liquid is contained inside the filter element, the filter element including a layered member of nets and non-woven fabrics in which each of the nets and the non-woven fabrics are alternately layered, wherein each of the nets has first fibers parallelly extending in one direction and second fibers parallelly extending in a direction angled to the one direction and contacting sides of the first fibers, wherein the first fibers and the second fibers forms mesh-pores at portions surrounded by the first fibers and the second fibers, wherein each of the non-woven fabrics has protrusions on surfaces of the each of the non-woven fabrics in a thickness-direction of the each of the non-woven fabrics, the protrusions formed to repeatedly come out on the surfaces of the each of the non-woven fabrics in a surface-direction of the each of the non-woven fabrics, and wherein in the protrusions in the thickness-direction, a height of anyone of the protrusions and the mesh-pores of the each of the nets are formed such that from one of the surfaces of a net among the nets next to anyone of the non-woven fabrics, through anyone of the mesh-pores corresponding to the anyone of the protrusions among the protrusions, the anyone of the protrusions among the protrusions of the non-woven fabrics does not reach an opposite side to the one of the surfaces of the net next to anyone of the non-woven fabrics.

Advantageous Effects of Invention

According to the present invention, structurally, the flow path of liquid in a filter can be maintained, and the long-life as a filter element for high-viscosity and high-solid-content ratio slurry liquid can be achieved.

BRIEF DESCRIPTION OF DRAWINGS

FIG. 3C is a Y-Y cross-section view of FIG. 3B, illustrating the schematic view of the fabric construction in a net-structure that is a part of the filter element as an embodiment of the present invention.

DESCRIPTION OF EMBODIMENTS

Figure 1:
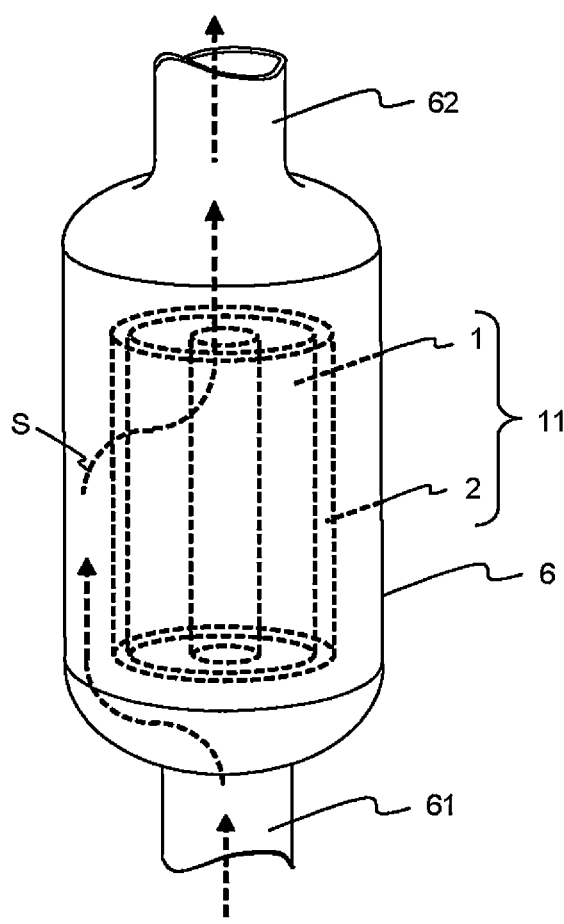
FIG. 1 is a view illustrating a filter container in which a filter element as an embodiment of the present invention is contained.

As follows, with reference to FIG. 1 to FIG. 5, it is explained, a filter element of the present invention. At first, with reference to FIG. 1, it is explained, a filter element 1 and a filter container 6 with the filter element 1. FIG. 1 represents a filter element 1 in an embodiment of the present invention and a filter container 6 having the filter element 1. The filter container 6 is a container in which slurry liquid is flown inside to filter the liquid by the filter element 1. The filter container 6 has a guide pipe 61 to guide slurry liquid S therein and a discharge pipe 62 to discharge the liquid S from the inside of the filter container 6. The slurry liquid S, as shown in FIG. 1, is guided in the inside of the filter container 6 from the guide pipe 61 so that the liquid S is flown into the outside of the filter element 1. And then, liquid S flows toward the center along a radial direction of the filter element 1 from the outside of the filter element 1 to reach the center of the filter element 1 so that the liquid S is filtered. The filtered liquid S is discharged to the outside from discharge pipe 62.

The filter element 1 can be fixedly attached onto the filter container 6. Or, as shown in FIG. 1, the filter cartridge 11 including the filter element 1 inside can be detachably attached to the inside of the filter container 6. Hereinafter, it is explained as the example in which the filter element 1 is contained in the filter cartridge 11 as a part thereof.

Figure 2:
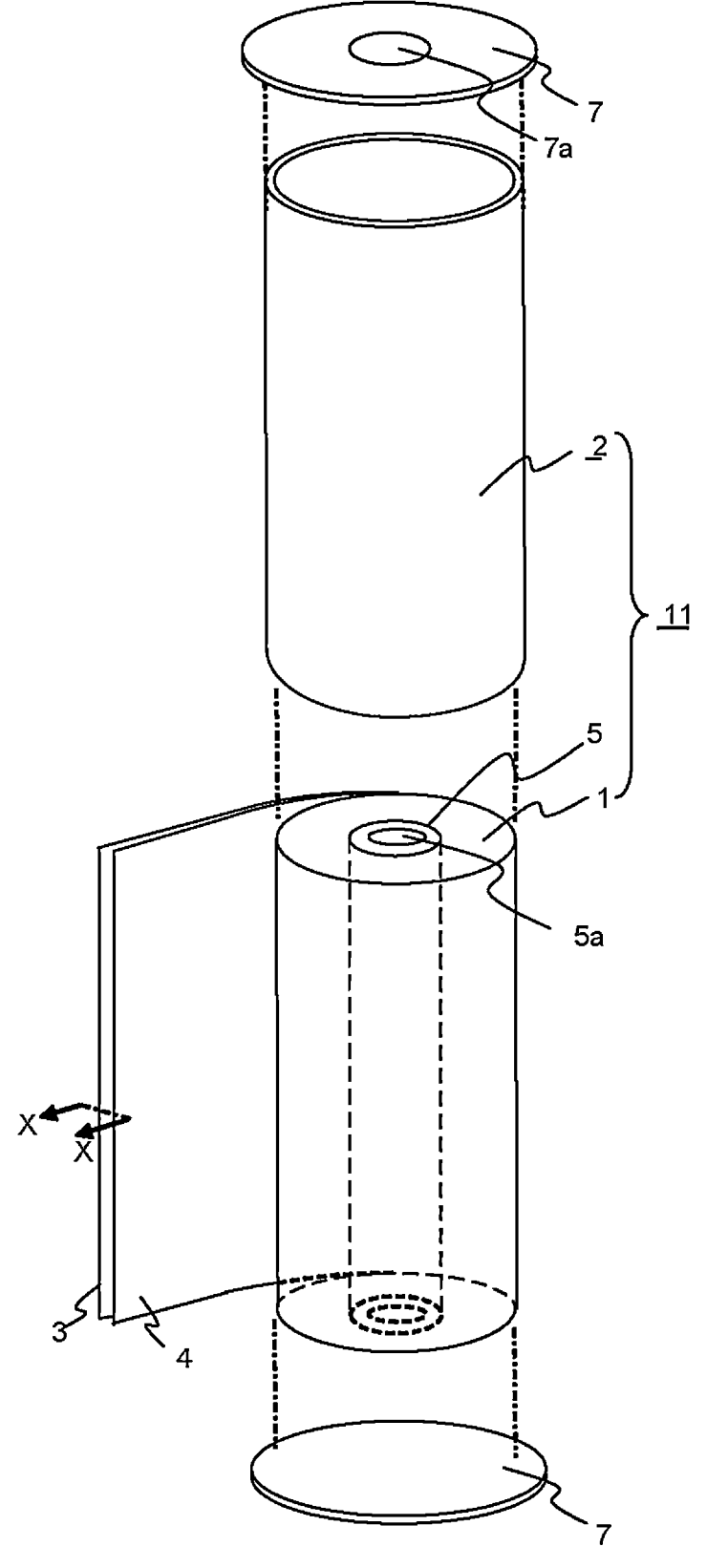
FIG. 2 is an exploded view illustrating a filter element and a filter cartridge with the filter element, showing the inside of the filter container of FIG. 1.
Figure 3A:
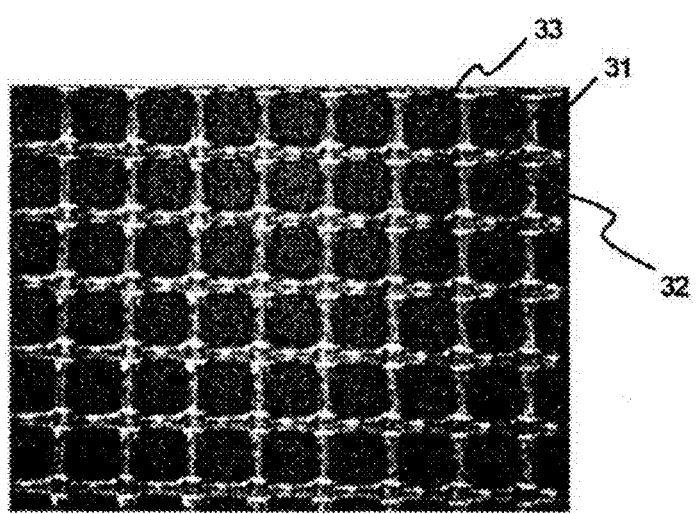
FIG. 3A is a photo enlarging the surface of a net-structure that is a part of the filter element as an embodiment of the present invention.
Figure 3B:
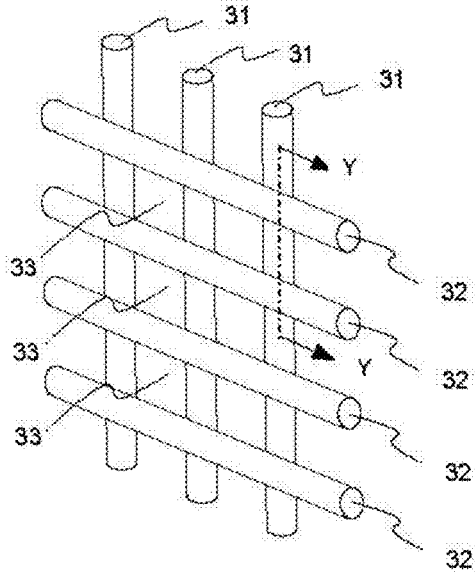
FIG. 3B is a schematic view illustrating the fabric construction of a net-structure that is a part of the filter element as an embodiment of the present invention.
Figure 3C:
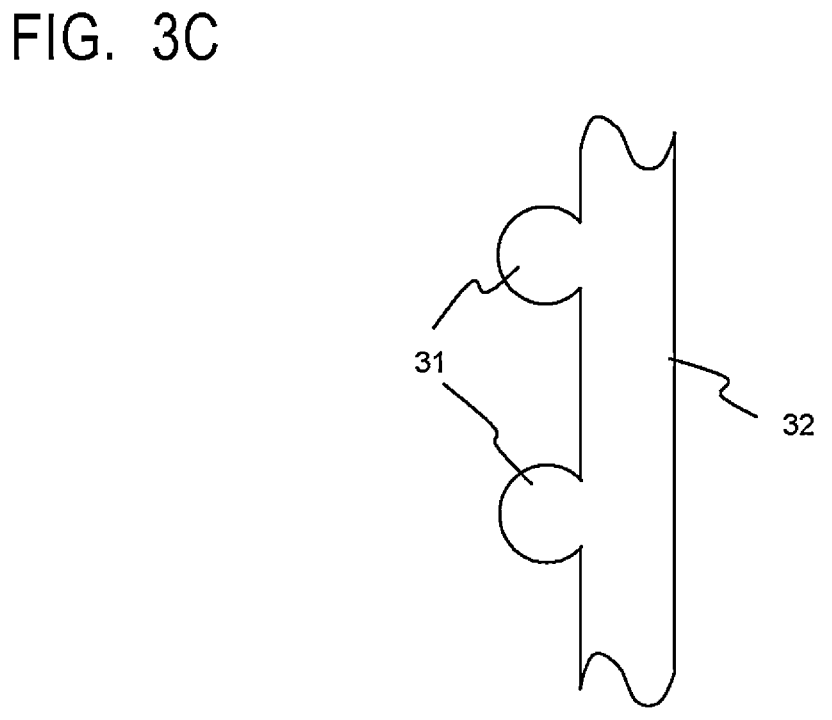
Figure 4A:
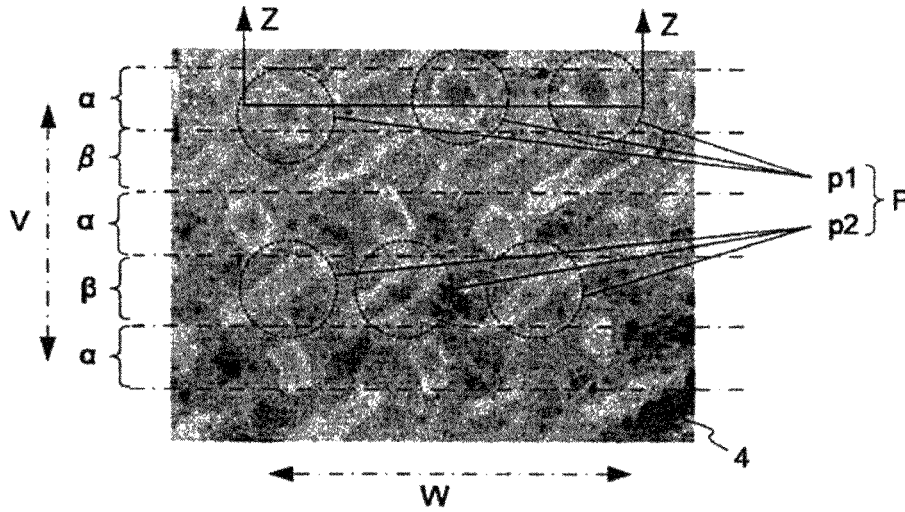
FIG. 4A is a photo enlarging the surface of a non-woven fabric that is a part of the filter element as an embodiment of the present invention.
Figure 4B:
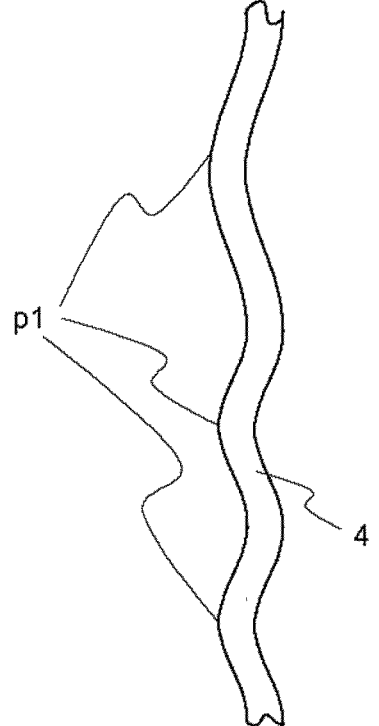
FIG. 4B is a schematic view of a Z-Z cross-section of FIG. 4A illustrating the cross-section shape of a fabric construction of a non-woven fabric that is a part of the filter element as an embodiment of the present invention.
Figure 5:
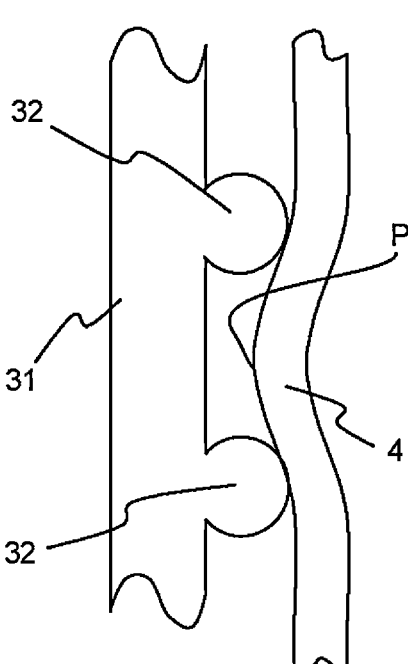
FIG. 5 is a view illustrating the relationship between a non-woven fabric and a net-structure in the filter element as an embodiment of the present invention.

Next, with reference to FIGS. 2 to 5, they are explained, the filter element 1 and filter cartridge 11. FIG. 2 shows the filter cartridge 11 extracted from the inside in FIG. 1 with the filter element 1 on which a net and a non-woven fabric are winded, in the broken state, wherein a part of the winded of the filter element 1 are peeled off in the view. FIGS. 3A to 3C show the net 3 as a part of the filter element 1. FIGS. 4A to 4C show the non-woven fabric 4 as a part of the filter element 1. FIG. 5 shows the relationship of layers between the net 3 and the non-woven fabric 4 as the filter element 1 that is the cross-section X-X of FIG. 2. Although the net 3 and the non-woven fabric 4 are shown in a separate state to facilitate understanding in FIG. 2, the net 3 and the non-woven fabric 4 contact with each other in the assembled state in FIG. 5. The filter cartridge 11 has a filter element 1 and a mesh-type cover 2. The mesh-type cover 2 is representatively a member having a cylindrical shape and a hollow portion with openings at both ends, and is attached on the outside of the filter element 1 as an outer shell so as to contain the filter element 1 in the hollow portion. The mesh-type cover 2 in a number of through-holes that penetrate between the outside and the inside, the through-holes being a flow path of the liquid S between the outside surface of the filter element 1 and the inside surface of the filter element 1.

The filter element 1 is formed so that the net 3 and the non-woven fabric 4 are alternately layered to be representatively a layered member having a cylindrical shape whose inside is hollow. The net 3 is provided to keep a distance to the non-woven fabric 4 adjacent as a filter element. Although he layered method can be freely chosen, the filter element 1 as a layered member can be representatively formed by winding a layered set plural times on the outer surface of the core member 5 having a cylindrical shape that has a hollow portion 5 inside, with loads of a predetermined tension, the layered set formed so that the net 3 and the non-woven fabric 4 are doubled by adding a load with a predetermined tension each of the net 3 and the non-woven fabric 4. By that, the filter element 1 is layer-formed so that the net 3 or the non-woven fabric 4 alternately comes out in the radius direction in the filter element 1.

In the filter element 1, in the case where the filter element 1 is composed as a part of filter cartridge 11, the filter element 1 is contained in the mesh-type cover 2 and openings on the both ends are closed with the end cap 7. One end cap 7 between them has a circular-plate-shape having a donut-shape with a center hole 7*a*. In the state where the end cap 7 is attached to the filter cartridge 11, the center hole 7*a* connects to the hollow portion 5*a* of the core member 5 to form a guide path to guide the filtered liquid S to the discharge conduit 62. No center hole 7*a* is provided on the other end cap 7 to guide the liquid to the outer surface of the filter element 1 as a surface to block the liquid S.

Next, with reference to FIGS. 3A to 3C, the net 3 included in the filter element 1 is explained. FIG. 3A is a photo of representative aspect of the net 3. FIG. 3B is a schematic view showing the relationship of fibers of the net 3. FIG. 3C shows the Y-Y cross-section of FIG. 3. As shown in FIGS. 3A to 3C, the net 3 includes first fibers formed to extend in a direction and second fibers 32 formed to extend another direction angled to the direction in which the first fibers extend. Each of the first fibers 31 extends in parallel with each other, and each of the second fibers 32 extends in parallel with each other. The direction in which the first fibers 31 extend and the direction angled to the direction in which the first fibers 31 extend can be chosen as an arbitrary angle, it is chosen representatively as 90 degrees, that is the relationship in which the first fibers 31 perpendicularly intersect the second fibers 32.

In the net 3, mesh-pores 33 is formed in the portions surrounded by the first fibers 31 and the second fibers 32. Plural mesh-pores 33 are formed in the portion surrounded by the first fibers 31 and the second fibers 32. The first fibers 31 and the second fibers 32 are formed to be fixed to respectively contact and fuse with sides of them. That is, the net 3 has a spaced-fibers-crossing-structure in which one surface of the net 3 has pits and protrusions by the first fibers 31 and the opposite surface (other surface) of the net 3 has pits and protrusions by the second fibers 32. The thickest protrusions of the net 3 are formed at the crossings of the first fibers 31 and the second fibers 32.

That is, in the net 3, as one surface of the net 3 is formed as the first fibers 31 are arranged with predetermined distances in parallel, and the opposite surface (other surface) of the net 3 is formed as the second fibers 32 are arranged with predetermined distances in parallel, so that the surfaces are formed to adjacent with each other. The fiber diameter of each of the first fibers 31 and the second fibers 32 can be chosen 250 micrometers to 350 micrometers in average. The predetermined distances of the first fibers 31 and the second fibers 32 of the net 3 is determined, for example, as 900 micrometers in average for the whole of surfaces of the net 3. The details are explained later in the portion about the layered structure of the net 3 and the non-woven fabric 4.

Next, with reference to FIGS. 4A to 4C, the non-woven fabric 4 is explained. FIG. 4A is a photo in which the surface of the non-woven fabric 4 is enlarged. In FIG. 4A, representatively, the portion indicated with a broken line circle corresponding to the protrusion P. FIG. 4B is a schematic view showing the Z-Z cross-section of FIG. 4A. The non-woven fabric 4 is a non-woven fabric having surface structure in which protrusions P repeatedly come out in a surface direction so that the protrusions P protruded in a thickness direction repeatedly come out in a surface direction of the non-woven fabric 4. The protrusions P repeatedly come out in a predetermined direction of the non-woven fabric 4. To repeatedly come out in a predetermined direction is meant as the protrusions P are formed so that pits and protrusions are formed arbitrarily in a predetermined direction W. The predetermined direction is not necessary to be strictly in horizontal or in vertical while the protrusions P tend to be formed in an arbitrary direction. The protrusions P is defined as the portion whose height is higher than the average surface height around the protrusions P of the non-woven fabric. Also, furthermore, the protrusions P has one type of shapes, while plural types of shapes can be chosen. In FIG. 4A, it is shown, an example in which plural types of shapes of the protrusions P are formed on the non-woven fabric 4. The plural types of shapes of the protrusions P, for example, as shown in FIG. 4A, can be the first types of shapes of the protrusions p1, and the second types of shapes of the protrusions p2. In this case, the first types of shapes of the protrusions p1, and the second types of shapes of the protrusions p2, are formed so that the first types of shapes of the protrusions p1, and the second types of shapes of the protrusions p2, are respectively formed in an arbitrary predetermined direction W on the non-woven fabric 4. The size of the protrusions P preferably has 1000 micrometers width, 4000 micrometers lengths and 800 micrometers peak height tmax in average values.

That is, for example, the first types of shapes of the protrusions p1 are formed in the band area α formed in the predetermined direction W, while similarly the second types of shapes of the protrusions p2 are formed in the band area β formed in the predetermined direction V. Then, the band area α and the band area β are formed alternatively provided in the direction W and the direction V perpendicular to the direction W. That is, they are formed as the band area α and the band area β are not positioned at the next with each other, and the same types of shapes of the protrusions P are not positioned at the next with each other. The first types of shapes of the protrusions p1, and the second types of shapes of the protrusions p2 can be representatively formed as the average area on the non-woven fabric 4 about foot portions of the protrusions P are different or formed as the average height from the foot portions to the tip portions of the protrusions P are different. Furthermore, as shown in FIG. 4A, the shapes of the foot portions on the non-woven fabric 4 of the second types of shapes of the protrusions p2 can be elongated, while the shapes of the foot portions on the non-woven fabric 4 of the first types of shapes of the protrusions p1 can be shorter than those. As long as the non-woven fabric 4 has surfaces such that the protrusions P appears repeatedly in the surface direction of the non-woven fabric 4, no limitation is needed for the non-woven fabric 4.

In the non-woven fabric 4, as the fibers included in the non-woven fabrics, they are mixed, 20 percentages of fibers having diameters twice of the average fiber diameter, and remaining of fibers having fibers having diameters within the average fiber diameter. That is, for example, the fibers in the non-woven fabrics are chosen as 80 percentages of the fibers having fiber diameters within the range of 20 micrometers to 30 micrometers and 20 percentages of the fibers having fiber diameters that exceeds 50 micrometers.

Next, with reference to FIGS. 2 and 5, in the filter element 1, it is explained how the net 3 and the non-woven fabric 4 are configured. FIG. 5 is a figure showing the relationship between the mesh-pores 33 and the protrusions P of the non-woven fabric 4. As described above, the net 3 and the non-woven fabric 4 are formed so that the layered set of the net 3 and the non-woven fabric 4 are winded plural times with addition of a predetermined tension on the outer surface of the core member 5 in the condition where the net 3 and the non-woven fabric 4 are doubled. In this time, by winding of the net 3 and the non-woven fabric 4 with the predetermined tension, the inner surface of the net 3 and the outer surface of the non-woven fabric 4 are respectively pressured and in contact with each other so that the filter member 1 is formed as a layered member in which the net 3 and the non-woven fabric 4 are alternatively winded.

In this state, each of the protrusions contacts one of the crossing of the first fibers 31 and the second fibers 32, or meets each of the mesh-pore 33. In this case, the portion where each of the protrusions contacts one of the crossing of the first fibers 31 and the second fibers 32 is a portion where each of the protrusions P as the thickest portion in the net 3 and each of the protrusions as the peak-thickness tmax portion in the non-woven fabric 4 intersect with each other, and a flow path of the liquid S between the net 3 and the non-woven fabric 4 is easily secured. In the contrast, the portions where each of the protrusions of the non-woven fabric 4 meets each of the mesh-pores 33 of the net 3 is a portion where each of the protrusions of the non-woven fabric 4 enters into each of the mesh-pores 33 of the net 3 to be difficult to secure a flow path of the liquid S between the net 3 and the non-woven fabric 4.

In the present invention, however, the fiber diameters of each of the first fibers 31 and the second fibers 32 of the net 3 and the interval distance between the first fibers 31 and the second fibers 32 can be adjusted by selecting specification factors of the net 3 and the non-woven fabric 4 and their configurations, so that as shown in FIG. 5, the protrusions P of the non-woven fabric 4 does not reach even ¼ of the thickness of the net 3. That is, in the present invention, in the net 3, because the interval distance of the second fiber 32 can prevent the protrusions P of the non-woven 4 from entering into the mesh-pores 33, the non-woven fabric 4 does not reach the portion of the first fibers 31 of the net 3 at these portions. That is, the sizes of the mesh-pores 33 of the net 3 are defined as the sizes in which the protrusion P of the non-woven fabric 4 does not reach from one side to the other side as the opposite side of the net 3 at these portions. That is, the heights of the protrusions P of the non-woven fabric are selected to be equal to or less than the thickness of the net 3 because the whole of the protrusions P easily enters into the mesh-pores 33 of the net 3 in the case where the mesh-pores 33 of the net 3 is larger than widths and length of the protrusions P (for example, like the protrusions p1 in FIG. 4A). On the other hand, the heights of the portions of among the protrusions P entering into mesh-pores 33 are selected to be equal to or less than the thickness of the net 3 because the whole of the protrusions P does not enter into the mesh-pores 33 of the net 3 in the case where the mesh-pores 33 of the net 3 is smaller than widths and length of the protrusions P (for example, like the protrusions p2 in FIG. 4A).

By configuring the filter element 1 as above, in the case where the inner surface of the net 3 and the outer surface of the non-woven fabric 4 are respectively pressured and contacts with each other, even if the contact degree is made to be higher by increasing the predetermined tension at some level, that is, by increasing the pressure given by the non-woven fabric 4 onto the net 3, it is possible by those to keep a sufficient gap between the net 3 and the non-woven fabric 4 to secure the flow path of the liquid S at the portion where each of the protrusions of the non-woven fabric 4 meets each of the mesh-pores 33 of the net 3.

This application claims the priority on Japanese patent application No. 2020-080190 filed on Apr. 30, 2020, and the contents of the application is recited as a part of this application.

REFERENCE SIGNS LIST

1 filter element
2 mesh-type cover

3 net
4 non-woven fabric
5 core member
5a hollow portion
6 filter container
7 end cap
7a hole
11 filter cartridge
31 first fiber
32 second fiber
33 mesh-pores

The invention claimed is:

1. A filter element for filtering slurry liquid, the filter element comprises a layered member of nets and non-woven fabrics in which each of the nets and the non-woven fabrics are alternately layered, wherein each of the nets has first fibers parallelly extending in one direction and second fibers parallelly extending in a direction angled to the one direction and contacting sides of the first fibers, wherein the first fibers and the second fibers forms mesh-pores at portions surrounded by the first fibers and the second fibers in each of the nets, wherein each of the nets has one surface in which the first fibers are parallelly provided with a predetermined distance and another surface in which the second fibers are parallelly provided with a predetermined distance, the one surface is an opposite surface of the another surface, wherein pits are formed between each of the first fibers on the one surface of the each of the nets and between each of the second fibers on the another surface of the each of the nets, thickest protrusions of the nets being formed at crossings of the first fibers and the second fibers of the nets, and mesh-pores are formed in portions surrounded by the first fibers and the second fibers, wherein fiber diameters of the each of the first fibers and the second fibers of the nets range from 250 micrometers to 350 micrometers in average, and the predetermined distances of the first fibers and the second fibers of the nets is 900 micrometers in average, wherein each of the non-woven fabrics has protrusions on surfaces of each of the non-woven fabrics in a thickness-direction that is a direction along a thickness of each of the non-woven fabrics, the protrusions of the non-woven fabrics being defined as portions that are higher than an average surface height around the protrusions of the non-woven fabrics and the protrusions do not reach ¼ of a thicknesses of the net at each of the mesh-pores, and the protrusions of the non-woven fabrics are repeatedly formed on the surfaces of each of the non-woven fabrics in a direction within a plane of each of the non-woven fabrics, wherein the fibers in the non-woven fabrics comprise 80 percent of the fibers having fiber diameters within a range of 20 micrometers to 30 micrometers, and 20 percent of the fibers have fiber diameters that exceed 50 micrometers, wherein a size of the protrusions of the non-woven fabrics have widths of 1000 micrometers, lengths of 4000 micrometers, and 800 micrometer peak heights in average values, wherein each of the protrusions of the non-woven fabrics are positioned at a portion where each of the protrusions of the non-woven fabrics contact one of the crossings of the first fibers and the second fibers of the nets, or meets each of the mesh-pores of each of the nets, a portion where each of the protrusions of the non-woven fabrics contact one of the crossings of the first fibers and the second fibers of the nets is a portion where each of the protrusions are a thickest portion in the net and each of the protrusions have a peak-thickness portion in the non-woven fabric that intersect with each other, and at least one of the protrusions of the non-woven fabrics does not come into at least one of the mesh-pores of the nets at the portion where each of the protrusions of the non-woven fabric meet each of the mesh-pores of each of the nets.

2. A filter element according to claim 1, wherein the layered member is formed by winding a set of a net and a non-woven fabric each of which contacts with each other on a cylindrical core member with multiple winding turns.

3. A filter element according to claim 1, wherein the non-woven fabrics are formed with fibers in which 20 percent of the fibers have a thickness at least twice an average fiber diameter of the fibers mixed with fibers that have an average fiber diameter.

4. A filter element according to claim 2, wherein the non-woven fabrics are formed with fibers in which 20 percent of the fibers have a thickness at least twice an average fiber diameter of the fibers mixed with fibers that have an average fiber diameter.

5. A filter element according to claim 1, wherein the protrusions have plural types of shapes that repeatedly come out in a predetermined direction on the surfaces of each of the non-woven fabrics.

6. A filter element according to claim 2, wherein the protrusions further comprise a plurality of types of shapes that are repeatedly arranged in a predetermined direction on the surfaces of each of the non-woven fabrics.

7. A filter element according to claim 5, wherein in areas where the protrusions have the plural types of shapes, same shape-types, among the plural types of the shapes, are not positioned in a direction perpendicular to the predetermined direction.

8. A filter element according to claim 6, wherein in areas where the protrusions having the plural types of shapes, same shape-types, among the plural types of the shapes, are not positioned in a direction perpendicular to the predetermined direction.

9. A filter element according to claim 1, wherein the protrusions have plural types of shapes formed such that average diameters at foot portions of the plural types of shapes on the non-woven fabrics are different, or average heights between top portions and foot portions of the plural types of shapes on the non-woven fabrics are different.

10. A filter element according to claim 2, wherein the protrusions have plural types of shapes formed such that average diameters at foot portions of the plural types of shapes on the non-woven fabrics are different, or average heights between top portions and foot portions of the plural types of shapes on the non-woven fabrics are different.

11. A filter element according to claim 1, wherein the protrusions have plural types of shapes, the protrusions having at least one shape-type among each of the plural types of shapes are formed such that a shape of the at least one shape-type are elongated shape on the surfaces of the non-woven fabrics.

12. A filter element according to claim 2, wherein the protrusions have plural types of shapes, the protrusions having at least one shape-type among each of the plural types of shapes are formed such that a shape of the at least one shape-type are elongated shape on the surfaces of the non-woven fabrics.

13. A filter container comprising a filter element according to claim 1, the filter container contains the filter element inside.

14. A filter cartridge comprising a filter element according to claim 1, and a mesh-type cover including a cylindrical shape in which the filter element is contained.

15. A filter cartridge according to claim 14, wherein the filter cartridge is detachably attached inside any filter container in which slurry liquid passes.

16. A filter container comprising a filter cartridge according to claim 15.

\* \* \* \* \*